(12) United States Patent
Niemeyer et al.

(10) Patent No.: US 10,583,556 B2
(45) Date of Patent: Mar. 10, 2020

(54) MOTION STABILIZATION ON A MOTORIZED MONOPOD JIB

(71) Applicant: Disney Enterprises, Inc., Burbank, CA (US)

(72) Inventors: Günter Niemeyer, Pasadena, CA (US); Ali Utku Pehlivan, Hillsboro, OR (US)

(73) Assignee: Disney Enterprises, Inc., Burbank, CA (US)

( * ) Notice: Subject to any disclaimer, the term of this patent is extended or adjusted under 35 U.S.C. 154(b) by 173 days.

(21) Appl. No.: 15/639,362

(22) Filed: Jun. 30, 2017

(65) Prior Publication Data

US 2019/0001494 A1 Jan. 3, 2019

(51) Int. Cl.
*B25J 9/16* (2006.01)
*F16M 11/18* (2006.01)
(Continued)

(52) U.S. Cl.
CPC .............. *B25J 9/1638* (2013.01); *B25J 9/126* (2013.01); *B25J 9/1635* (2013.01); *F16M 11/06* (2013.01);
(Continued)

(58) Field of Classification Search
CPC ....... F16M 2200/041; F16M 2200/044; F16M 13/022; F16M 11/048; F16M 11/123;
(Continued)

(56) References Cited

U.S. PATENT DOCUMENTS

| 4,017,168 A | 4/1977 | Brown |
| 4,946,272 A | 8/1990 | Brown |

(Continued)

FOREIGN PATENT DOCUMENTS

| CN | 202647109 U | 1/2013 |
| CN | 203811969 U | 9/2014 |

(Continued)

OTHER PUBLICATIONS

Lantsheer, Martijn, European Search Report for European Application No. EP18178234, dated Oct. 30, 2018, The Hague, Netherlands, 6 pages.

(Continued)

*Primary Examiner* — Nkeisha Smith
(74) *Attorney, Agent, or Firm* — Patterson + Sheridan, LLP

(57) ABSTRACT

One embodiment provides a method, including: detecting, using at least one sensor, a displacement event associated with a monopod jib, wherein the displacement event moves a portion of the monopod jib from a first position to a second position; calculating, using a processor, an adjustment value for at least one of a plurality of motors of a stabilization mechanism operatively coupled to the monopod jib, wherein the calculated adjustment value identifies a motor movement to counteract the displacement event; activating the at least one of a plurality of motors corresponding to the calculated adjustment value; and adjusting, using the activated at least one of the plurality of motors, at least one portion of the stabilization mechanism using the calculated adjustment value. Other embodiments are shown and described.

16 Claims, 8 Drawing Sheets

(51) Int. Cl.
   F16M 13/04       (2006.01)
   B25J 9/12        (2006.01)
   F16M 11/06       (2006.01)
   G03B 17/56       (2006.01)

(52) U.S. Cl.
   CPC ............ *F16M 11/18* (2013.01); *F16M 13/04* (2013.01); *G03B 17/561* (2013.01); *F16M 2200/041* (2013.01); *Y10S 901/09* (2013.01)

(58) Field of Classification Search
   CPC .. F16M 11/18; F16M 11/205; F16M 11/2085; F16M 11/24; G03B 17/561; B25J 9/1638
   USPC .......................................................... 248/550
   See application file for complete search history.

(56) References Cited

U.S. PATENT DOCUMENTS

| | | | |
|---|---|---|---|
| 5,065,249 A | 11/1991 | Horn et al. | |
| 5,963,749 A | 10/1999 | Nicholson | |
| 6,611,662 B1 | 8/2003 | Grober | |
| 6,808,324 B2 | 10/2004 | McKay | |
| 7,209,176 B2 | 4/2007 | Chapman | |
| 7,241,060 B2 | 7/2007 | Mootz et al. | |
| 7,355,627 B2 | 4/2008 | Yamazaki et al. | |
| 7,522,213 B2 | 4/2009 | Chapman | |
| 7,931,412 B2 | 4/2011 | Brown | |
| 8,125,564 B2 | 2/2012 | Kozlov et al. | |
| 8,143,083 B2 | 3/2012 | Ohta | |
| 8,534,934 B1 | 9/2013 | Carney | |
| 9,156,154 B2 | 10/2015 | Brown et al. | |
| 9,360,740 B2 * | 6/2016 | Wagner .................. | F16M 11/18 |
| 9,454,064 B2 | 9/2016 | Roberts et al. | |
| 9,534,730 B2 | 1/2017 | Black et al. | |
| 9,749,522 B2 * | 8/2017 | Holmes .................... | G06T 7/80 |
| 9,765,926 B2 * | 9/2017 | Chen ....................... | F16M 13/04 |
| 9,798,221 B2 | 10/2017 | Niemeyer et al. | |
| 9,851,046 B2 * | 12/2017 | Pan ......................... | F16M 11/18 |
| 9,874,308 B2 * | 1/2018 | Saika .................... | H04N 5/2328 |
| 9,904,147 B2 * | 2/2018 | Zhao .................... | G03B 17/561 |
| 9,921,459 B2 * | 3/2018 | Wagner .................. | F16M 13/04 |
| 9,973,665 B2 * | 5/2018 | Saha .................... | H04N 5/2252 |
| 10,107,446 B2 * | 10/2018 | Pan ........................ | F16M 11/16 |
| 10,208,887 B2 * | 2/2019 | Tian ....................... | F16M 13/04 |
| 2004/0223078 A1 * | 11/2004 | Zadok .................... | F16M 13/04 348/375 |
| 2005/0185089 A1 | 8/2005 | Chapman | |
| 2009/0003822 A1 | 1/2009 | Tyner | |
| 2011/0158619 A1 | 6/2011 | Kanayama | |
| 2012/0099851 A1 | 4/2012 | Brown | |
| 2014/0350395 A1 | 11/2014 | Shachaf et al. | |
| 2015/0219981 A1 | 8/2015 | Roberts et al. | |
| 2016/0033077 A1 | 2/2016 | Chen et al. | |
| 2016/0170289 A1 | 6/2016 | Matt | |
| 2016/0246162 A1 | 8/2016 | Niemeyer et al. | |
| 2016/0309080 A1 | 10/2016 | Chu et al. | |
| 2016/0323496 A1 | 11/2016 | Tsai et al. | |
| 2017/0159875 A1 | 6/2017 | Wagner et al. | |
| 2017/0227162 A1 | 8/2017 | Saika et al. | |
| 2018/0149949 A1 * | 5/2018 | Kim ....................... | F16M 11/06 |
| 2018/0273203 A1 * | 9/2018 | Zhang .................. | G03B 17/561 |
| 2018/0274720 A1 * | 9/2018 | Gubler .................. | F16M 13/02 |
| 2018/0335178 A1 * | 11/2018 | Bin ....................... | F16M 13/04 |
| 2019/0002125 A1 * | 1/2019 | Bin ....................... | B64D 47/08 |

FOREIGN PATENT DOCUMENTS

| | | |
|---|---|---|
| CN | 203812021 U | 9/2014 |
| CN | 104360690 A | 2/2015 |
| CN | 204227000 U | 3/2015 |
| CN | 204437648 U | 7/2015 |
| CN | 106168326 A | 11/2016 |
| EP | 2919064 A1 | 9/2015 |
| EP | 3316567 A1 | 5/2018 |
| ES | 2564393 A1 | 3/2016 |
| KR | 20160099437 A | 8/2016 |
| WO | 2016190994 A1 | 12/2016 |

OTHER PUBLICATIONS

Gil Zamorano, Gunnar, European Search Report for European Patent Application Serial No. 17194823, dated Mar. 7, 2018, 3 pages, Munich, Germany.

Afanasiev, Andrey, European Search Report for European Patent Application Serial No. 16183612, dated Mar. 17, 2017, 3 pages, The Hague, Netherlands.

* cited by examiner

MOTION STABILIZATION ON A MOTORIZED MONOPOD JIB

BACKGROUND

Monopod jibs (a monopole, pole, boom, stick, handle, or other device on which something can be attached at the end) are used with attachments that allow for the attachment of a pointer (e.g., laser pointer, camera, directional microphone, projector, light, etc.). An operator may then use the monopod jib with attached pointer to perform particular actions, for example, a monopod jib equipped with a camera may be used to capture certain shots that require the camera to be extended outward from a camera operator. Certain monopod jibs are equipped with a gimbal, i.e., an arrangement that acts to facilitate or control movement of the pointer mounted on the monopole jib. For example, a gimbal may be used to balance or counterbalance a pointer, buffering it from motion. Additionally, certain monopod jibs are provided with a multi-axis gimbal, which may be motorized, e.g., one or more motors may be provided to actively control movement of the gimbal components, and thus the pointer.

BRIEF SUMMARY

In summary, one aspect provides a method, comprising: detecting, using at least one sensor, a displacement event associated with a monopod jib, wherein the displacement event moves a portion of the monopod jib from a first position to a second position; calculating, using a processor, an adjustment value for at least one of a plurality of motors of a stabilization mechanism operatively coupled to the monopod jib, wherein the calculated adjustment value identifies a motor movement to counteract the displacement event; activating the at least one of a plurality of motors corresponding to the calculated adjustment value; and adjusting, using the activated at least one of the plurality of motors, at least one portion of the stabilization mechanism using the calculated adjustment value.

Another aspect provides an apparatus, comprising: a monopod jib; at least one sensor; a plurality of motors; a processor; a memory device that stores instructions executable by the processor to: detect, using the at least one sensor, a displacement event associated with a monopod jib, wherein the displacement event moves a portion of the monopod jib from a first position to a second position; calculate, using the processor, an adjustment value for at least one of a plurality of motors of a stabilization mechanism operatively coupled to the monopod jib, wherein the calculated adjustment value identifies a motor movement to counteract the displacement event; activate the at least one of a plurality of motors corresponding to the calculated adjustment value; and adjust, using the activated at least one of the plurality of motors, at least one portion of the stabilization mechanism using the calculated adjustment value.

A further aspect provides a product, comprising: a storage device that stores code, the code being executable by a processor and comprising: code that detects, using at least one sensor, a displacement event associated with a monopod jib, wherein the displacement event moves a portion of the monopod jib from a first position to a second position; code that calculates an adjustment value for at least one of a plurality of motors of a stabilization mechanism operatively coupled to the monopod jib, wherein the calculated adjustment value identifies a motor movement to counteract the displacement event; code that activates the at least one of a plurality of motors corresponding to the calculated adjustment value; and code that adjusts, using the activated at least one of the plurality of motors, at least one portion of the stabilization mechanism using the calculated adjustment value.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims.

DETAILED DESCRIPTION

Figure 1:
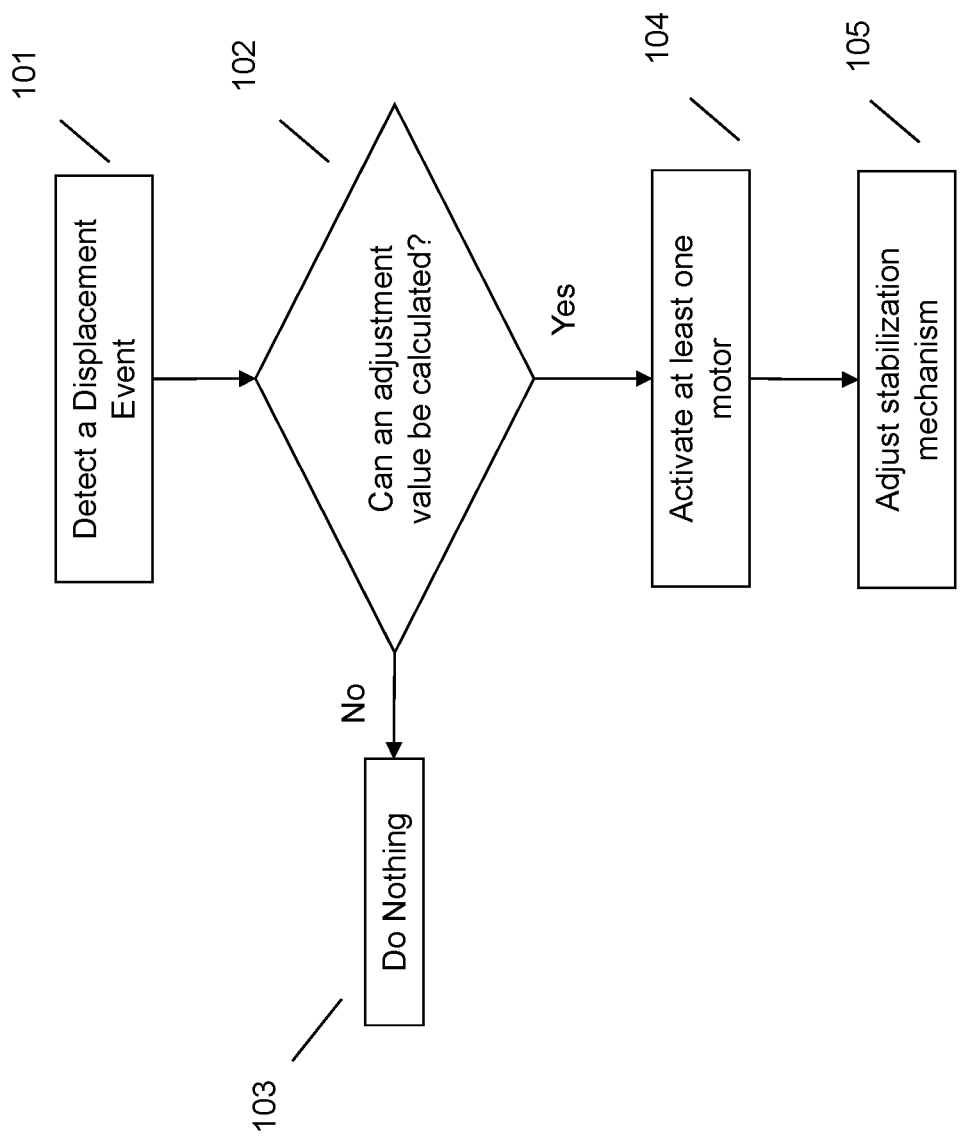
FIG. 1 illustrates an example method of adjusting a portion of a stabilization mechanism based on determined acceleration data according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

Monopod jibs equipped with a camera are frequently used in the film and television industry to capture various types of shots. The term monopod jib will be used herein throughout to refer to handle assembly only. The term monopod jib includes any device or assembly which can be used for mounting a device at a position on the jib or to extend the reach of an operator. For example, the term monopod jib may include a handle, stick, monopole, pole, boom, and the like, and may or may not include additional components, for example, electronics, mechanical components, extensions, or other components. A monopod jib can then be equipped with an attachment mechanism that allows the attachment of a pointer at a position on the jib. A pointer may include any device that may be mounted on a jib and whose direction and rotation can be controlled by the jib. For example, the term pointer may refer to a camera, laser pointer, light, microphone, projector, and the like. For ease of readability, the following discussion will focus on a monopod jib with an attached camera. However, this is not intended to limit the scope of this application to only a jib with a camera.

Monopod jib assemblies with attached cameras allow an operator to follow (e.g., by walking with the jib) a moving scene, attain different camera angles of the same stationary scene, etc. Some monopod jibs include a gimbal. The gimbal provides a mechanism to rotate and move the pointer or the camera attached to the end of the monopod jib. However, although a jib with a gimbal is able to fix a camera so that it constantly points in a desired direction, the ambulatory movement of the operator may distort the recorded image. For example, when a recording of a scene that was filmed with a moving camera is played back, the up and down walking motion generated by the operator may be reflected in the recording. More particularly, the foreground may shift in relation to the background of the image, thereby distorting the scene and affecting the quality of the shot.

Conventionally, in order to stabilize a camera and prevent operator movement from affecting the shot, operators have utilized a Steadicam®, or other like devices. The Steadicam® consists of a large body harness strapped to an operator as well as a jointed mechanism that "absorbs" the weight of the camera. This design configuration allows the camera to effectively float in front of the operator, remaining substantially still regardless of user movement. A primary reason why this configuration works is because many of the cameras used in filming have a great deal of mass which relates to inertia, so the camera does not want to move. Therefore, even if an operator moves, the camera itself moves very slowly and all of the disturbances generated from the ambulatory movement of the operator are absorbed.

However, these conventional methods of camera stabilization are unable to be directly applied to cameras attached to monopod jibs or lightweight cameras. The problem with the application of the conventional approach is that cameras associated with the Steadicam® configuration are able to leverage their heavy mass to smooth out the picture. However, when using a monopod jib, heavy cameras simply cannot be placed far out on the jib because an operator would be unable to effectively hold and carry the jib. Therefore, lighter cameras must be utilized.

Accordingly, an embodiment provides a system including a stabilization mechanism. In one embodiment, the stabilization mechanism may be used for maintaining the pointing direction of a camera, for example, for maintaining the pointing direction of a camera attached to a monopod jib. In an embodiment, a displacement event (e.g., a movement of the jib, a movement of the gimbal, etc.), for example, associated with ambulatory movement of an operator, and the like, may be detected. In one embodiment the displacement event may be detected using one or more sensors disposed on the jib and/or other mechanical component of the system (e.g., gimbal, camera, motor, etc.).

Subsequent to the detection, an embodiment may calculate an adjustment value for at least one of the plurality of motors of a stabilization mechanism operatively coupled to the monopod jib. The adjustment value may identify a desired motor movement to counteract the displacement event. The desired motor movement may include a movement of one or more of the motors that counteracts the displacement event (e.g., the motors move in a manner which results in a particular point on the jib or other mechanical component of the system remaining at a constant point). In other words, the movement of the motors results in a particular point on the jib or other mechanical component not moving in response to the displacement event.

In one embodiment the adjustment value may identify a desired deflection and desired joint angle to counteract the displacement event. The adjustment value may be based upon a determined amount of the movement associated with the displacement event, for example, by determining, using an accelerometer, a value of acceleration associated with the displacement event. In one embodiment, the adjustment value may be based upon a determined pointing direction or position of the camera or pointer in three-dimensional space, which may be detected using position sensors or other sensors disposed on the jib or other mechanical component. The adjustment value may then be based upon maintaining the pointing direction of the camera and/or maintaining the camera at the same location in the three-dimensional space.

An embodiment may include a plurality of motors, e.g., five as used in the non-limiting examples illustrated, which control movement of the stabilization mechanism in coordination with movements of the monopod jib by the operator. The examples as described herein use five motors. However, a different number of motors may be used, for example, three, four, and the like. Responsive to the calculation, an embodiment may activate at least one of the motors to adjust a portion of the stabilization mechanism, for example, to maintain the camera at a consistent position (e.g., a consistent height, a fixed position in three-dimensional space, the pointing direction, etc.). Such a method reduces instances of image distortion by maintaining the height of the camera at a consistent level throughout the shot.

The illustrated example embodiments will be best understood by reference to the figures. The following description is intended only by way of example, and simply illustrates certain example embodiments.

Monopod jibs (a monopole or pole or boom) are used with attachments that allow for the attachment of a pointer (e.g., laser pointer, camera, directional microphone, projector, light, etc.). An operator may then use the monopod jib with attached pointer to perform particular actions, for example, a monopod jib equipped with a camera may be used to capture certain shots that require the camera to be extended outward from a camera operator. Examples of monopod jib architecture and design may be found in co-pending U.S. patent application Ser. No. 15/429,666, the contents of which are incorporated by reference herein. Further details regarding monopod jib architecture are largely omitted to focus on aspects of the stabilization mechanism used to maintain the camera at a consistent three-dimensional position in space.

Referring now to FIG. 1, an embodiment may adjust a portion of a stabilization mechanism, for example, to maintain a camera attached to a monopod jib at a consistent pointing direction. At 101, an embodiment may detect a displacement event associated with a camera operatively coupled to a monopod jib. In an embodiment, the displacement event may be any event or force that may change the position of the camera, or component coupled to the camera, from an original position in space. For example, the displacement event may originate from ambulatory movements of a jib operator, strong gusts of wind that shake the jib, other forces affecting the movement of the jib, and the like. In an embodiment, the displacement event may be associated with a displacement of at least a portion of the monopod jib in any three-dimensional direction in space (e.g., up, down left, right, forward, backward, etc.). A displacement event is not necessarily a single event, for example, a movement up or down, rather, a displacement event may be a continuously continuing event, for example, a camera operator moving throughout the day. In other words, a displacement event may refer to a single event or may refer to a series of events or continuous events.

In an embodiment, the detecting may be done by at least one movement measuring sensor (e.g., an accelerometer, position sensors, a combination of sensors, another movement measuring device, etc.). For ease of readability, the movement measuring sensor used as an example throughout will be one or more accelerometers. However, this designation is not intended to be limiting and other movement measuring sensors may be used. In an embodiment, the accelerometer may be operatively coupled to the camera, operatively coupled to a stabilization mechanism associated with the camera, or operatively coupled to any other place on the monopod jib capable of accurately measuring aspects related to an expected displacement of the camera. The systems and methods as described herein are intended to stabilize the camera and prevent any displacement of the camera. Accordingly, the system and methods as described herein identify an expected displacement of the camera, as if the stabilization mechanism were not included.

The displacement event may also be detected using position sensors or other sensors for detecting the position of an object within a three-dimensional space and/or detecting the pointing direction of the object. The position sensors may determine the position of a portion of the monopod jib or other mechanical component of the system within the three-dimensional space. For example, the camera attached to the monopod jib may include a position sensor, distance sensor, optical sensor, or other sensor that can be used to determine the position of the camera within space or the pointing direction of the camera, for example, the distance from the camera to the ground, the distance from the camera to other objects in space, a type of positioning sensor or other sensor that can determine three-dimensional coordinates of the camera within space, sensors for detecting the angle of the camera, and the like.

In response to the displacement event, an embodiment may calculate an adjustment value for at least one of a plurality of motors of a stabilization mechanism operatively coupled to the monopod jib. The stabilization mechanism and motors will be described in more detail below. The calculated adjustment value may identify an amount of adjustment or movement for one or more of the motors that will counteract the displacement event. As an example, if a camera is attached to the monopod jib, the adjustment value may identify a value or amount for movement of the motors in order to maintain the pointing direction of the camera or maintain the camera at a three-dimensional position in space. In one embodiment, the calculated adjustment value may identify a desired deflection and desired joint angle that will counteract the displacement event.

Figure 5:
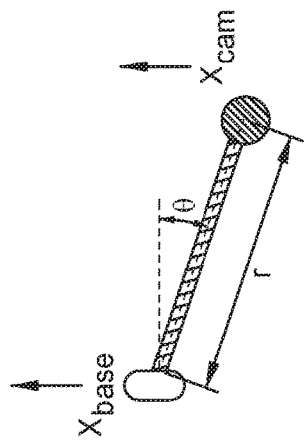
FIG. 5 illustrates a vertical stabilization joint according to an embodiment.

To calculate the desired deflection and desired joint angle a vertical stabilization joint may be pictured as shown in FIG. 5.

The vertical stabilization joint may be represented by:

$$\Delta x = x_{base} - x_{cam} \quad (1)$$

The following equations include the following variables:
$x_{base}$: position of the portion of the monopod jib in 3-dimensional space
$x_{cam}$: position of the camera in 3-dimensional space
$\Delta x$: deflection between the portion of the monopod jib and the camera
$\dot{x}_{base}$: velocity of the portion of the monopod jib in 3-dimensional space
$\dot{x}_{cam}$: velocity of the camera in 3-dimensional space
$\Delta \dot{x}$: relative velocity between the portion of the monopod jib and the camera
$\ddot{x}_{cam}$: acceleration of the camera in 3-dimensional space
s: Laplace operator
a[n]: newest acceleration value
$\theta_d[n]$: newest desired joint angle value
$\Delta x_d[n]$: newest desired deflection value
$\Delta \dot{x}_d[n]$: newest desired derivative of deflection value
$\Delta \ddot{x}_d[n]$: newest desired $2^{nd}$ derivative of deflection value
$\Delta x_d[n-1]$: previous desired deflection value
$\Delta \dot{x}_d[n-1]$: previous desired derivative of deflection value
$\xi$: desired damping ratio of filter
$\omega_n$: desired natural frequency of filter
r: joint effective radius In order to have the dynamics of a large inertia $m_d$ as well as a low re-equilibrating stiffness $K_d$ and damping $B_d$ we use the equation:

$$m_d \ddot{x}_{cam} = B_d(\dot{x}_{base} - \dot{x}_{cam}) + K_d(x_{base} - x_{cam}) \quad (2)$$

and assert the filtering transfer function:

$$\frac{X_{cam}}{X_{base}} = \frac{B_d s + K_d}{m_d s^2 + B_d s + K_d} = \frac{2\xi\omega_n s + \omega_n^2}{s^2 + 2\xi\omega_n s + \omega_n^2} \quad (3)$$

Greater stabilization with a larger desired inertia and a softer virtual spring implies a lower cutoff frequency. Accordingly, the corresponding $\Delta x$ would obey:

$$\Delta X = \frac{s^2 X_{base}}{s^2 + 2\xi\omega_n s + \omega_n^2} = \frac{s^2 X_{cam}}{2\xi\omega_n s + \omega_n^2} \quad (4)$$

The desired deflection can then be computed using:

$$\frac{\Delta X_d}{A} = H(s) = \frac{1}{s^2 + 2\xi\omega_n s + \omega_n^2} \quad (5)$$

For a single direction in three-dimensional space, and using a discrete time implementation, performing calculations every $\Delta T$ seconds (e.g., every 1 millisecond, every 10 milliseconds, etc.) this equation could be implemented by sequentially computing:

$$\Delta \ddot{x}_d[n] = a[n] - 2\xi\omega_n \Delta \dot{x}_d[n-1] - \omega_n^2 \Delta x_d[n-1] \quad (5A)$$

$$\Delta \dot{x}_d[n] = \Delta \dot{x}_d[n-1] + \Delta T \Delta \ddot{x}_d[n] \quad (5B)$$

$$\Delta x_d[n] = \Delta x_d[n-1] + \Delta T \Delta \dot{x}_d[n] \quad (5C)$$

The desired joint angle may be computed using:

$$\theta_d = \sin^{-1}\frac{\Delta x_d}{r} \approx \frac{\Delta x_d}{r} \quad (6)$$

Using equation (5C), equation (6) maybe implemented computing:

$$\theta_d[n] = \frac{\Delta x_d[n]}{r} \quad (6A)$$

Where the filter (damping ratio and natural frequency) describes how smoothly the displacement event should be counteracted and how much noise should be removed from the acceleration values. The effective joint radius describes the distance from the appropriate motor the camera. Using a proportional+derivative joint controller, the actual camera dynamics are governed by:

$$m\ddot{x}_{cam} = b(\Delta\dot{x} - \Delta\dot{x}_d) + k(\Delta x - \Delta x_d) + F_{dist} \quad (7)$$

where the actual mass m is subject to the effective controller gains b and k as well as force disturbances $F_{dist}$. Accordingly, substituting the desired deflection (5) into the actual camera dynamics (7) results in the closed-loop dynamics:

$$X_{cam} = \frac{bs+k}{ms^2+bs+k}\frac{2\xi\omega_n s + \omega_n^2}{s^2+2\xi\omega_n s+\omega_n^2}X_{base} + \frac{1}{ms^2+bs+k}F_{dist} \quad (8)$$

High controller gains reject any disturbances while the low virtual stiff and high desired mass independent set $\omega_n$ to filter the unintended displacement events.

In one embodiment, the adjustment value may be based upon an acceleration value associated with the displacement event. For example, an accelerometer may measure the amount and direction of acceleration associated with the displacement event. The system may then use this acceleration value to determine the adjustment value to counteract the displacement event. In an embodiment, the acceleration value may relate to the acceleration of a portion of the monopod jib moving from a first position (e.g., an original position) to a second position (e.g., a displaced position). In an embodiment, the portion of the monopod jib may be any portion that may provide an accurate reflection of the acceleration the portion of the jib or camera attached to the jib may experience.

The system may only include a single accelerometer capable of measuring acceleration in a single direction. However, measurement of acceleration in more than one direction is desirable. Therefore, if the accelerometer only measures acceleration in a single direction, the system may include more than one accelerometer to capture acceleration in a different direction. Alternatively, some accelerometers measure acceleration in more than one direction, for example, the accelerometer may measure acceleration on one, two, or three axes. The three-directional rate measurement capabilities of the accelerometer allow acceleration to be measured in any direction. In an embodiment, the acceleration value may be used to determine additional information about the displacement event such as the direction of displacement and the distance of displacement.

To determine a displacement direction, an embodiment may compare the acceleration value to the numerical value of the force of gravity at the Earth's surface (i.e., 1 g or 9.8 m/s$^2$). For example, for an object at rest, the accelerometer will measure exactly 1 g of acceleration. If an object is pulled upwards an accelerometer will measure greater than 1 g of acceleration. If an object is pulled downwards an accelerometer will measure less than 1 g of acceleration. An embodiment may therefore determine a value for an acceleration value associated with a displacement event and compare that value to 1 g to determine a displacement direction, for example, a value less than 1 g indicates the displacement direction is down, a value greater than 1 g indicates the displacement direction is up, and the like. In an embodiment, an accelerometer may be calibrated to detect displacement in any direction (up, down, left, right, etc.).

To determine a displacement distance, an embodiment may analyze the acceleration value to predict a distance a portion of the monopod jib may have been displaced. For example, a portion of the monopod jib may have been vertically moved two inches from an initial position as a result of ambulatory movement of an operator. In an embodiment, the prediction may be done by methods known to those having ordinary skill in the art (e.g., by counting the number of clock cycles, etc.). For example, the system may detect an acceleration or movement and may count the number of clock cycles until the acceleration or movement subsides. Then, by knowing the number of clock cycles and the value for the acceleration, the system can solve the acceleration formula to determine the distance traveled during the displacement event.

In one embodiment, calculation of an adjustment value may be based upon the pointing direction or three-dimensional position of the camera or pointer in space. The adjustment value may be calculated or computed to maintain the pointing direction or three-dimensional position of the camera. The adjustment value may then be calculated based upon a value associated with the displacement event, the pointing direction of the pointer, and a compensation value of at least one spring of the stabilization mechanism, as discussed in more detail below. In other words, calculation of the adjustment value may include coordinating with the gimbal, angle, and/or pointing stabilization. In other words, to accurately compensate or counteract the displacement event, the system may identify not only the three-dimensional position of the camera and/or acceleration value, but the system may also identify where the camera is currently pointed and/or the angle at which the camera is pointed. Such information may be derived from sensors other than those already discussed, sensors as already discussed, or information received from another component of the system, for example, position information from the gimbal. The gimbal may also act as the stabilization mechanism, as discussed in more detail below. The stabilization may then be completed using the coordinated information and the weight compensation, as explained in more detail below.

If an adjustment value cannot be calculated at 102, the system may perform no action at 103. Alternatively, the calculation may still occur, but the system may determine that the adjustment value should be zero. However, if an adjustment value can be calculated at 102, the system may activate the at least one motor corresponding to the calculated adjustment value at 104. For example, if the adjustment value indicates that two motors should be adjusted to fulfill the adjustment value, these motors may be activated. In an embodiment, the camera may be operatively coupled to the stabilization mechanism which may itself be operatively coupled to an end of the monopod jib. The stabilization mechanism may comprise a variety of components such as a multi-axis gimbal (e.g., a three axis gimbal as shown in FIG. 2), a plurality of motors (e.g., five motors as shown in FIG. 3), a camera shelf, and at least one spring.

Figure 2:
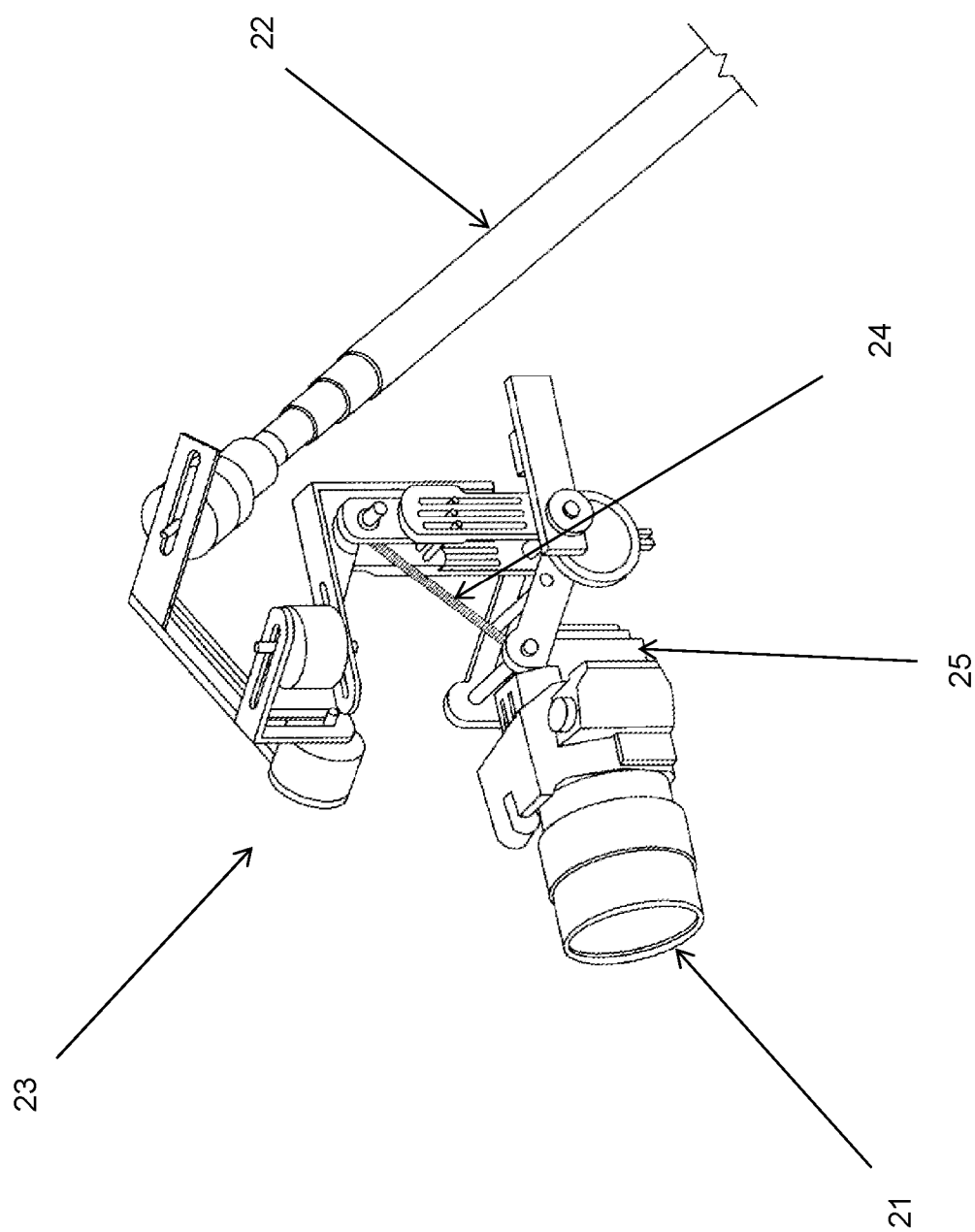
FIG. 2 illustrates an example configuration of a camera operatively coupled to a stabilization mechanism.

Referring now to FIG. 2, the camera 21 may be mounted on an end of the monopod jib 22 (e.g., by way of the multi-axis gimbal 23). The camera may be attached to the main part of the monopod jib 22 via the multi-axis gimbal 23. In an embodiment, a spring 24 may be located between the camera shelf 25 and a portion of the gimbal 23. The camera 21 may be attached to and securely rest on the camera shelf 25. Such a configuration alleviates the weight of the camera off of the motors. The illustrated spring arrangement in FIG. 2 is only an example embodiment and other spring placement configurations may be utilized. In an embodiment, the size and tension of the spring may depend on a bounce coefficient of the camera used. The bounce coefficient may refer to dimensional aspects of the camera such as mass, length, width, etc. For example, a camera weighing 5 pounds will require a different type of spring, having a different length, tension, size, and the like, than a camera weighing 10 pounds.

Figure 3:
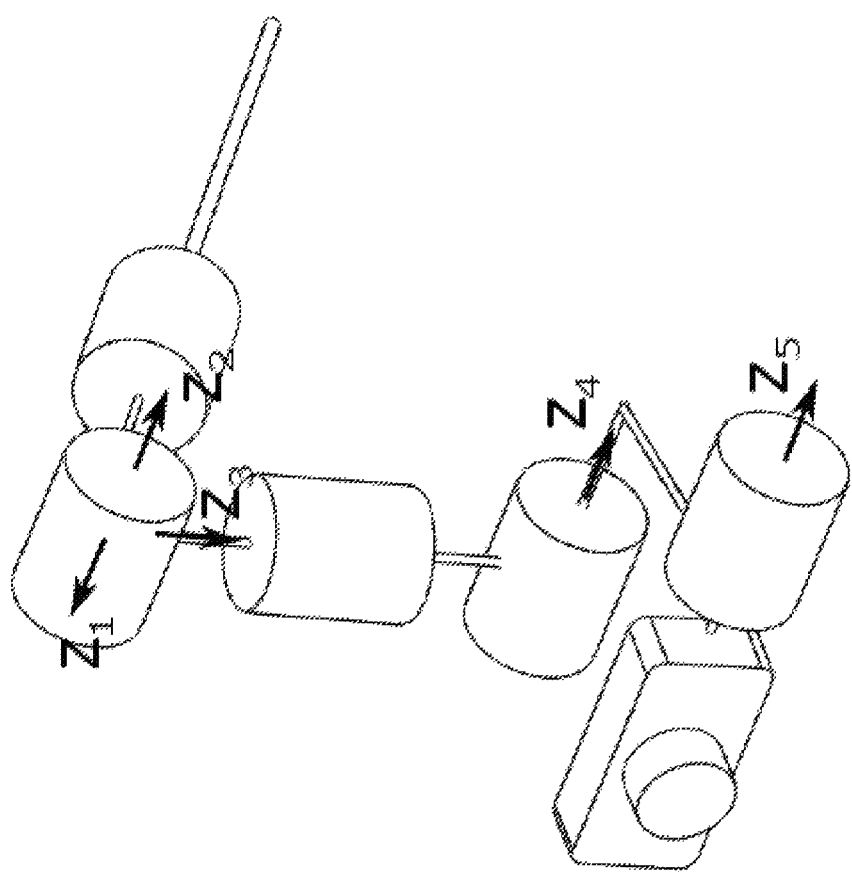
FIG. 3 illustrates an arrangement of motors associated with the stabilization mechanism.

Referring now to FIG. 3, an example arrangement of a plurality of motors associated with the stabilization mechanism is illustrated. In FIG. 3, five motors (i.e., $Z_1$-$Z_5$) are illustrated; however, fewer or additional motors may be used in different arrangements and embodiments. In an embodiment, the camera's viewing angle (e.g., pan/tilt/roll functions) is controlled by three motors $Z_1$, $Z_3$, and $Z_5$, which offer three axes of rotation (e.g., that enable pointing of the camera left, right, up, and down). In an embodiment, two additional motors, e.g., $Z_4$ and $Z_5$, are used in the stabilization mechanism to account for vertical displacement events (e.g., up and down displacement resulting from ambulatory movements of a jib operator). Additional motors may be used to account for displacement events in the horizontal direction (e.g., from shaking the jib left and right, etc.) as well as the directions in the z-plane (e.g., forward and backward). Each motor may not have a single role. Rather, a combination of motors may be used to perform a single function. For example, in the example, motors $Z_4$ and $Z_5$ are used in combination to account for the vertical displacement. However, it should be understood that other motors could be used alone, or in combination, to perform different functions.

Figure 4A:
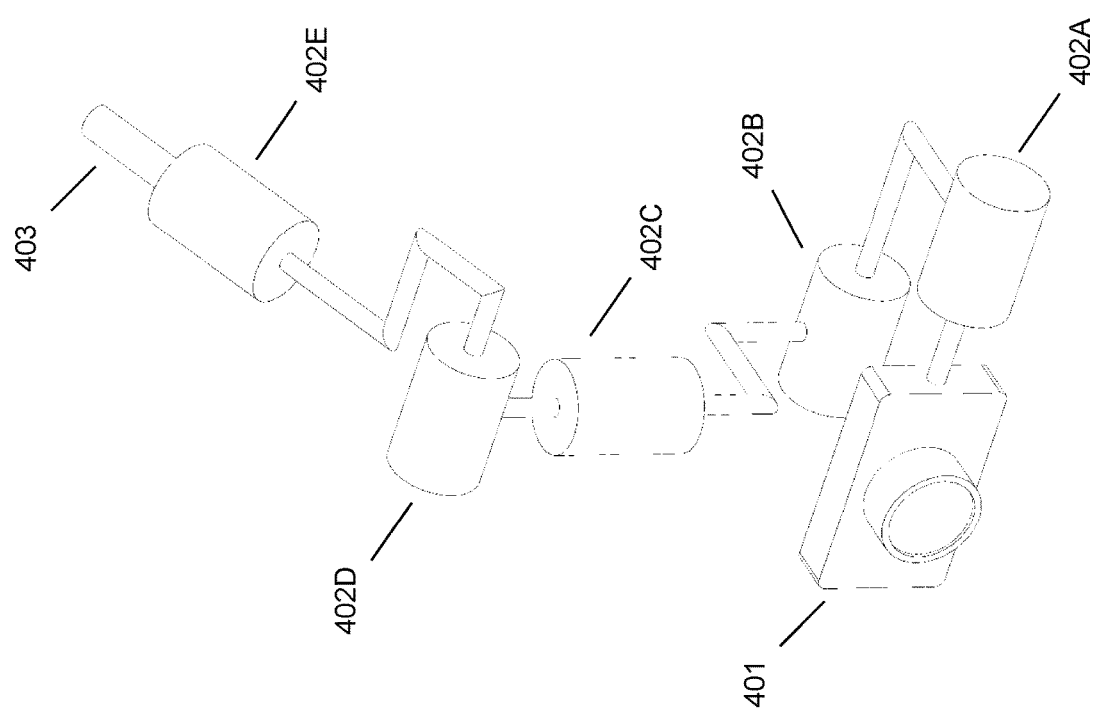
FIGS. 4A-4E illustrate arrangements of motors associated with the stabilization mechanism in response to movements of the monopod jib.
Figure 4B:
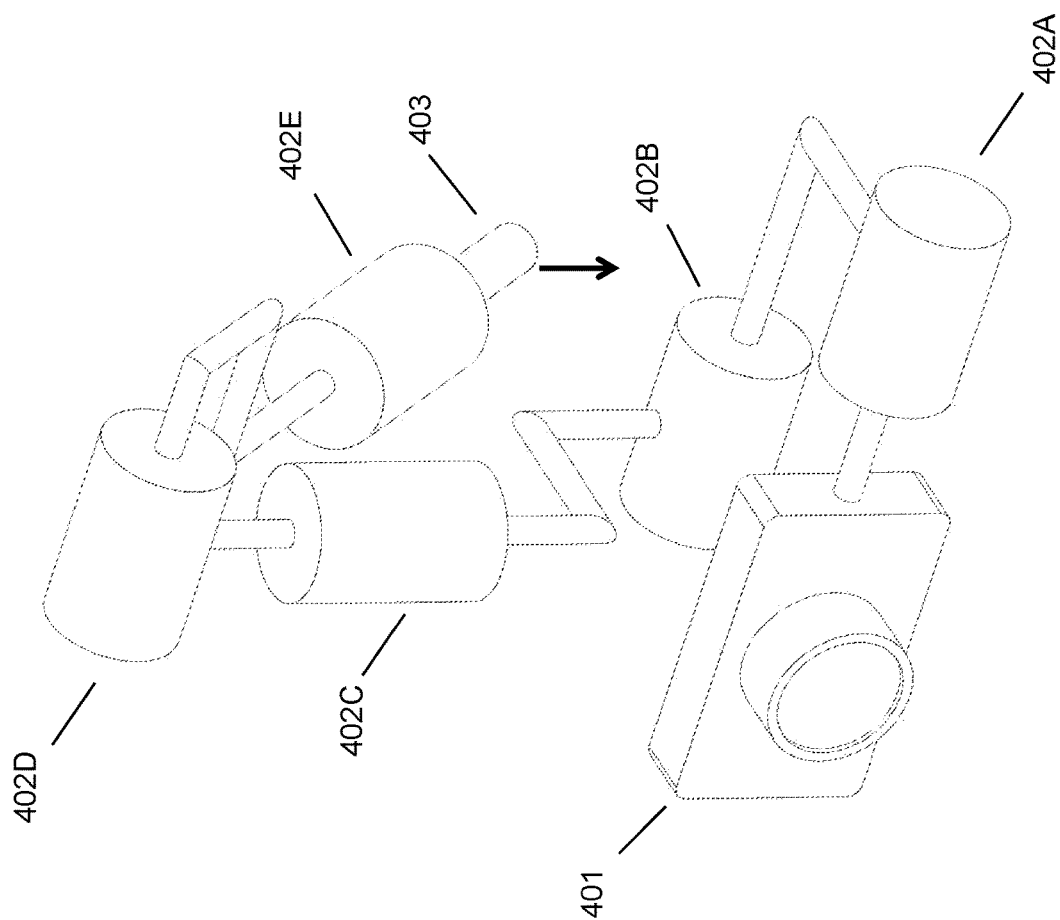
Figure 4C:
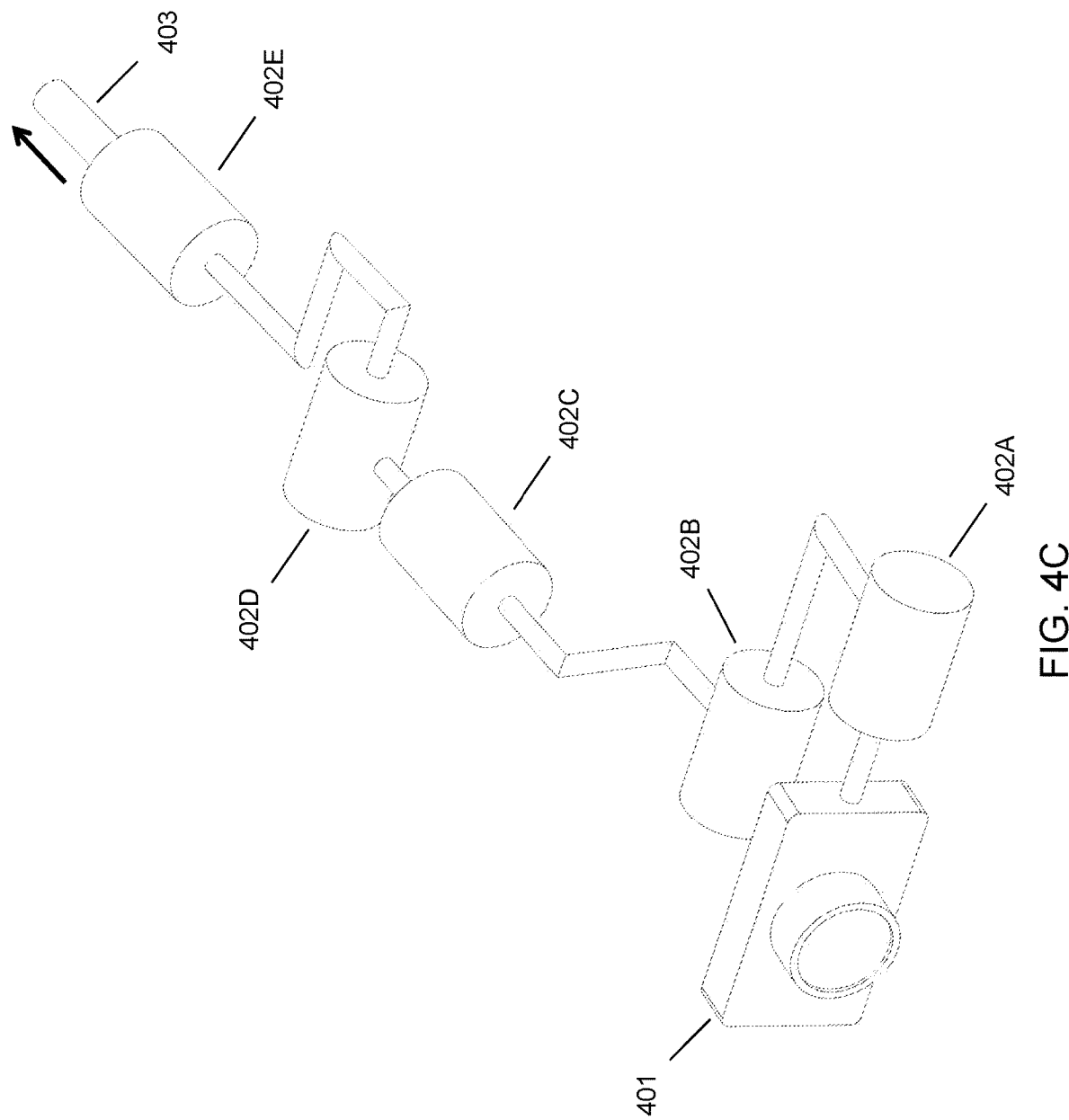
Figure 4D:
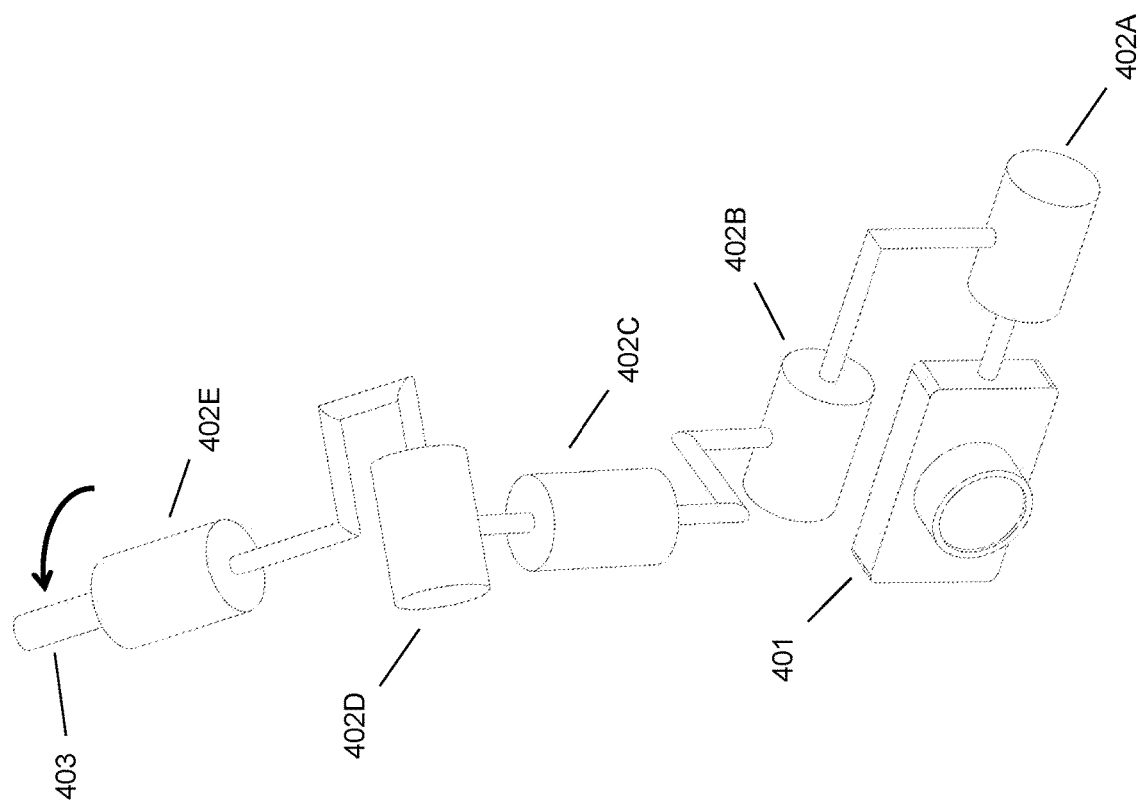

For example, FIGS. 4A-4E illustrate some example monopod jib movements and corresponding motor functions to compensate. FIG. 4A illustrates the camera 401 and motors 402A-402E in a "normal" or no displacement event detected position. In FIG. 4B, the monopod jib 403 has been moved and rotated down. Accordingly, motor 402D works to compensate for or counteract the monopod 403 movement and maintain the camera 401 at the same position in space. In FIG. 4C, the monopod jib 403 has been pulled back. Accordingly, two motors 402B and 402D coordinate together to compensate for this movement. In FIG. 4D, the monopod jib 403 has been rotated and moved up. Accordingly, three motors 402A, 402B, and 402C work together to not only maintain the camera 401 at the same position in space and the same pointing direction.

Figure 4E:
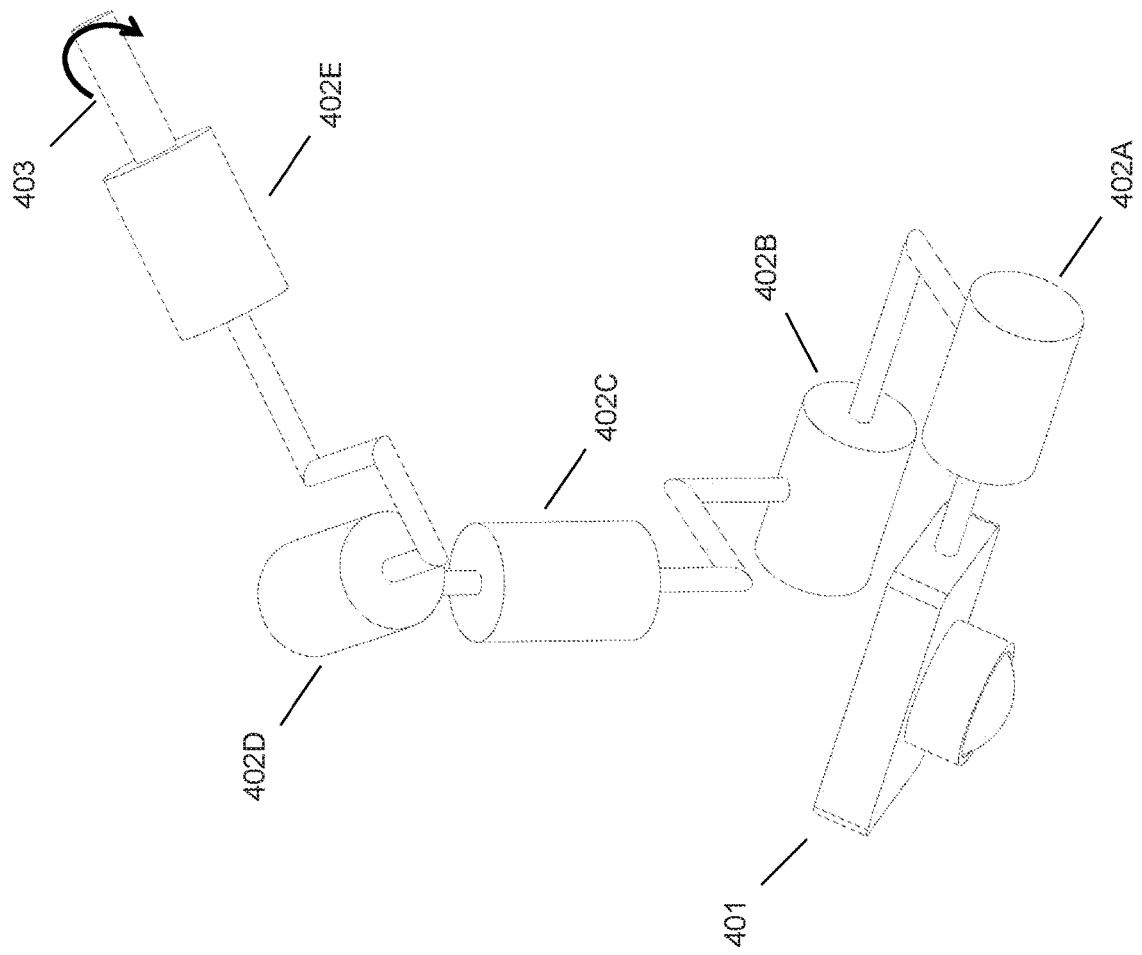

FIG. 4E illustrates that the motors may compensate for monopod jib 403 movement and adjust the pan and/or tilt of the camera 401. In FIG. 4E, the monopod job 403 has been rotated and the operator wants to tilt the camera 401. However, the operator does not want the camera to vertically move in space. Accordingly, two motors 402A and 402C work together to not only maintain the camera 401 at the same position vertically, but to also move the camera to the desired angle. In other words, the motors will work together to perform the desired function while still maintaining the pointing direction or the camera in the same three-dimensional position in space. Other motors may be inserted to compensate or perform other functions, for example, an additional motor may be inserted to roll the camera and/or compensate for the movement of the gimbal from side-to-side. FIGS. 4A-4E are merely illustrations. Other motor configurations are possible and contemplated. Additionally, motors other than those designated may work alone or in combination to perform the functions illustrated in the figures. The coordination of the motors is determined using the calculated adjustment value identified at 102.

At 105, an embodiment may adjust a portion of the stabilization mechanism using at least one of the motors. In an embodiment, a portion of the stabilization mechanism may refer to a single portion. For example, the portion of the stabilization mechanism may be a portion that is most directly associated with the camera (e.g., the camera shelf 25). In another embodiment, multiple portions of the stabilization mechanism (e.g., the gimbal 23, the camera shelf 25, the spring 24, etc.).

In an embodiment, the portion(s) of the stabilization mechanism is adjusted by a determined amount associated with the displacement event. The determined amount may be an amount necessary for a camera to remain at its original position. For example, if a portion of the monopod jib is displaced vertically by two inches, responsive to determining the distance and direction of displacement (e.g., by analyzing the acceleration value) the plurality of motors may adjust a portion of the stabilization mechanism downwards by a corresponding amount to maintain the same pointing direction of the camera or maintain the camera at the same three-dimensional position it was at prior to the displacement event. In an embodiment, the plurality of motors may work together to adjust the stabilization mechanism, or, alternatively, only one motor may be activated to adjust the stabilization mechanism.

As discussed in detail above, the system may measure the monopod jib and/or camera acceleration. This acceleration may then be sent through a low pass filter to filter any noise caused by the accelerometer or other sensor. The system may then process this acceleration value into an adjustment value to identify an amount or type of adjustment to be performed by one or more of the motors. Alternatively, or in addition to, the system may determine the pointing direction and/or position of the camera in three-dimensional space. The adjustment value may then be based upon the position rather than the acceleration value. Additionally, the system may measure the monopod jib and camera rotation/orientation and process pan/tilt commands to identify the motor commands needed to perform the desired function. Finally, the system may compensate for the weight of the camera, either using a spring or identifying a force on the system. To compensate for the weight, the system maintains one axis close to vertical to constrain the weight compensation to a single axis.

Once the system has the adjustment value, the motor commands for moving the camera, and the weight compensation, the system integrates and coordinates these functions into motor commands that will perform the requested adjustment while maintaining the camera's pointing direction and/or the three-dimensional position in space. The system then sends the necessary signals to the motors to carry out the computed commands. Accordingly, the described system provides a system in which the stabilization can be performed by the gimbal, using components on the gimbal or other mechanical components of the system, without needing large pieces of equipment to perform the adjustments and provide compensation for the movements of an operator.

The various embodiments described herein thus represent a technical improvement to adjusting a stabilization mechanism of a monopod jib to maintain a camera at a particular position in space. Using the techniques described herein, an embodiment may determine an acceleration value associated with a displacement event and from that determination may identify the direction of displacement and predict the distance of displacement. Responsive to these calculations, an embodiment may then activate at least one of a plurality of motors to adjust a stabilization mechanism operatively coupled to a camera to maintain the camera at the same position it was at prior to the displacement event. Such techniques reduce instances of image distortion by maintaining the position of the camera at a consistent level throughout the shot.

The system may include additional components, for example, a user interface element, microcontrollers, communication mechanisms, and the like. For example, a microcontroller or processor may be used to provide instructions for moving the motors. As an example, a microcontroller or processor may receive the movement information, analyze the information, correlate the analyzed information to a motor movement, and provide instructions to the one or motors to move by the identified amount. As another example, the camera may communicate with a camera microcontroller, for example mounted on the gimbal. A central or main microcontroller may then coordinate the actions of the system. The microcontrollers and/or processors may be connected by a communication bus, e.g., via a standard RS 485 serial bus. Each motor may also have a corresponding microcontroller that control the moving components of the gimbal and another microcontroller for an IMU mounted on the monopod jib. The monopod jib microcontroller may be used for normal operation of the monopod jib.

It should be noted that the various functions described herein may be implemented using instructions stored on a device readable storage medium such as a non-signal storage device that are executed by a processor. In the context of this document, a storage device is not a signal and "non-transitory" includes all media except signal media.

Program code embodied on a storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device.

In some cases, the devices or components referred to herein communicate by a connection facilitated through network, e.g., a local area network (LAN) or a wide area network (WAN), or the connection may be made through other devices, through wireless connections, e.g., near-field communication, or through a hard wire connection, such as over a USB connection or bus communications as described herein.

Example embodiments are described herein with reference to the figures, which illustrate example methods, devices and products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific figures are used, and particular examples have been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining a pointing direction of a pointer operatively coupled to a monopod jib;
   detecting, using at least one sensor, a displacement event associated with the monopod jib, wherein the displacement event moves a portion of the monopod jib from a first position to a second position;
   calculating, using a processor, an adjustment value for at least one of a plurality of motors of a stabilization mechanism operatively coupled to the monopod jib, wherein the adjustment value is calculated based upon a value associated with the displacement event, the pointing direction of the pointer, and a compensation value of at least one spring of the stabilization mechanism, wherein the calculated adjustment value identifies a motor movement to counteract the displacement event;
   activating the at least one of the plurality of motors associated with the calculated adjustment value; and
   adjusting, using the activated at least one of the plurality of motors, at least one portion of the stabilization mechanism using the calculated adjustment value.

2. The method of claim 1, wherein the displacement event comprises movement associated with an ambulatory movement of a user.

3. The method of claim 1, further comprising measuring, using an accelerometer, an acceleration value associated with the displacement event.

4. The method of claim 3, wherein measuring the acceleration value comprises determining an acceleration associated with the portion of the monopod jib moving from the first position to the second position.

5. The method of claim 3, further comprising determining, using the acceleration value, a distance between the first position and the second position.

6. The method of claim 3, further comprising determining a direction of the displacement event by comparing the acceleration value to a predefined unit associated with gravitational acceleration.

7. The method of claim 3, wherein the adjusting comprises adjusting responsive to Brownian movement resulting from accelerometer noise.

8. The method of claim 1, wherein the adjusting comprises adjusting the at least one portion of the stabilization mechanism by a calculated adjustment value to maintain the pointing direction of the pointer.

9. The method of claim 1, wherein the at least one spring comprises a size and a tension associated with a bounce coefficient of the monopod jib.

10. An apparatus, comprising:
a monopod jib;
a pointer operatively coupled to the monopod jib;
at least one sensor;
a stabilization mechanism operatively coupled to the monopod jib, the stabilization mechanism comprising a plurality of motors and at least one spring;
a processor;
a memory device that stores instructions executable by the processor to:
determine a pointing direction of the pointer;
detect, using the at least one sensor, a displacement event associated with the monopod jib, wherein the displacement event moves a portion of the monopod jib from a first position to a second position;
calculate, using the processor, an adjustment value for at least one of the plurality of motors, wherein the adjustment value is calculated based upon a value associated with the displacement event, the pointing direction of the pointer, and a compensation value of the at least one spring of the stabilization mechanism, wherein the calculated adjustment value identifies a motor movement to counteract the displacement event;
activate the at least one of the plurality of motors associated with the calculated adjustment value; and
adjust, using the activated at least one of the plurality of motors, at least one portion of the stabilization mechanism using the calculated adjustment value.

11. The apparatus of claim 10, wherein the instructions executable by the processor further comprise instructions to measure, using an accelerometer, an acceleration value associated with the displacement event.

12. The apparatus of claim 11, wherein the instructions executable by the processor to measure the acceleration value comprises instructions to determine an acceleration associated with the portion of the monopod jib moving from the first position to the second position.

13. The apparatus of claim 11, wherein the instructions executable by the processor further comprise instructions to determine, using the acceleration value, a distance between the first position and the second position.

14. The apparatus of claim 10, wherein the instructions executable by the processor to adjust comprise instructions executable to adjust the at least one portion of the stabilization mechanism by a calculated adjustment value to maintain the pointing direction of the pointer.

15. The apparatus of claim 10, wherein the at least one spring comprises a size and a tension associated with a bounce coefficient of the monopod jib.

16. A computer program product, the computer program product comprising:
a computer-readable storage medium having computer-readable program code embodied therewith, the computer-readable program code executable by one or more computer processors to perform an operation, the operation comprising:
determining a pointing direction of a pointer operatively coupled to a monopod jib;
detecting, using at least one sensor, a displacement event associated with the monopod jib, wherein the displacement event moves a portion of the monopod jib from a first position to a second position;
calculating an adjustment value for at least one of a plurality of motors of a stabilization mechanism operatively coupled to the monopod jib, wherein the adjustment value is calculated based upon a value associated with the displacement event, the pointing direction of the pointer, and a compensation value of at least one spring of the stabilization mechanism, wherein the calculated adjustment value identifies a motor movement to counteract the displacement event;
activating the at least one of the plurality of motors associated with the calculated adjustment value; and
adjusting, using the activated at least one of the plurality of motors, at least one portion of the stabilization mechanism using the calculated adjustment value.

* * * * *

UNITED STATES PATENT AND TRADEMARK OFFICE
CERTIFICATE OF CORRECTION

PATENT NO. : 10,583,556 B2  
APPLICATION NO. : 15/639362  
DATED : March 10, 2020  
INVENTOR(S) : Gunter Niemeyer et al.

Page 1 of 1

It is certified that error appears in the above-identified patent and that said Letters Patent is hereby corrected as shown below:

In the Specification

In Column 6, Line 64, delete "$\Delta\dot{x}_d[n]=a[n]-2\xi\omega_n\Delta\dot{x}_d[n-1]-\omega_n^2\Delta x_d[n-1]$" and insert --$\Delta\ddot{x}_d[n] = a[n] - 2\,\xi\,\omega_n\,\Delta\dot{x}_d[n-1] - \omega_n^2\,\Delta x_d[n-1]$--, therefor.

In Column 6, Line 65, delete "$\Delta\dot{x}_d[n]=\Delta\dot{x}_d[n-1]+\Delta T\Delta\dot{x}_d[n]$" and insert --$\Delta\dot{x}_d[n] = \Delta\dot{x}_d[n-1] + \Delta T\,\Delta\ddot{x}_d[n]$--, therefor.

Signed and Sealed this  
Ninth Day of June, 2020

Andrei Iancu  
*Director of the United States Patent and Trademark Office*